(12) United States Patent
Meylan et al.

(10) Patent No.: US 9,055,514 B2
(45) Date of Patent: Jun. 9, 2015

(54) METHOD AND APPARATUS FOR REQUESTING AND SHARING NETWORK PERFORMANCE INFORMATION (NPI)

(75) Inventors: Arnaud Meylan, San Diego, CA (US); Gerardo Giaretta, San Diego, CA (US); Julien H. Laganier, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 13/231,202

(22) Filed: Sep. 13, 2011

(65) Prior Publication Data

US 2012/0120824 A1 May 17, 2012

Related U.S. Application Data

(60) Provisional application No. 61/413,335, filed on Nov. 12, 2010, provisional application No. 61/450,524, filed on Mar. 8, 2011.

(51) Int. Cl.
| | |
|---|---|
| *H04L 12/26* | (2006.01) |
| *H04W 48/10* | (2009.01) |
| *H04W 48/14* | (2009.01) |
| *H04W 88/06* | (2009.01) |

(52) U.S. Cl.
CPC .............. *H04W 48/10* (2013.01); *H04W 48/14* (2013.01); *H04W 88/06* (2013.01)

(58) Field of Classification Search
CPC .................................................. H04W 48/10
USPC ........................................................ 370/252
See application file for complete search history.

(56) References Cited

U.S. PATENT DOCUMENTS

| 8,185,060 B2 | 5/2012 | Agashe et al. |
| 2004/0033778 A1* | 2/2004 | Fonseca et al. ............... 455/11.1 |
| 2006/0153089 A1* | 7/2006 | Silverman ....................... 370/252 |
| 2007/0178906 A1* | 8/2007 | Gao et al. ........................ 455/453 |
| 2007/0248060 A1* | 10/2007 | Mooney et al. ................ 370/338 |
| 2008/0192681 A1* | 8/2008 | Lee et al. ........................ 370/328 |
| 2009/0221283 A1 | 9/2009 | Soliman |
| 2010/0022243 A1* | 1/2010 | Oommen et al. ........... 455/435.3 |
| 2010/0029282 A1 | 2/2010 | Stamoulis et al. |
| 2010/0099416 A1 | 4/2010 | Kazmi et al. |

(Continued)

FOREIGN PATENT DOCUMENTS

| EP | 1227639 A2 | 7/2002 |
| EP | 1662836 A2 | 5/2006 |

(Continued)

OTHER PUBLICATIONS

International Search Report and Written Opinion—PCT/US2011/060278—ISA/EPO—Apr. 5, 2012.

(Continued)

*Primary Examiner* — Huy D Vu
*Assistant Examiner* — Kevin Cunningham
(74) *Attorney, Agent, or Firm* — Abdollah Katbab (57) ABSTRACT

Apparatus and methods that provide wireless communications, where a method for wireless communications includes determining network performance; and sharing NPI with a network node; wherein the NPI comprises information necessary for the network node to determine the performance available on a network.

60 Claims, 8 Drawing Sheets

(56) References Cited

U.S. PATENT DOCUMENTS

| | | | |
|---|---|---|---|
| 2010/0238826 A1 | 9/2010 | Borran et al. | |
| 2010/0278158 A1* | 11/2010 | Lee et al. | 370/338 |
| 2011/0116405 A1 | 5/2011 | Coppage et al. | |
| 2013/0051359 A1* | 2/2013 | Skarby | 370/330 |

FOREIGN PATENT DOCUMENTS

| | | |
|---|---|---|
| GB | 2452794 A | 3/2009 |
| JP | 2010050898 A | 3/2010 |
| TW | I318826 B | 12/2009 |
| WO | 2008059365 A2 | 5/2008 |
| WO | 2009131898 A1 | 10/2009 |

OTHER PUBLICATIONS

3GPP TSG RAN WG1 Meeting #56, "Discussion on Information Exchange Aspects of DL CoMP" R1-090686, Athens, Greece, Feb. 9-13, 2009.

Taiwan Search Report—TW100141291—TIPO—Mar. 6, 2014.

* cited by examiner

| 602 Element ID | 604 Length | 606 MU-MIMO Station Count | 608 Spatial Streams Under Utilization | 610 Busy Bandwidth Utility | 612 Backhaul Downlink Capacity | 614 Backhaul Uplink Capacity |
|---|---|---|---|---|---|---|
| 1 | 1 | 1 | 1 | 3 | 3 | 3 |

METHOD AND APPARATUS FOR REQUESTING AND SHARING NETWORK PERFORMANCE INFORMATION (NPI)

CROSS-REFERENCE TO RELATED APPLICATIONS

This application claims the benefit of U.S. Provisional Patent application Ser. No. 61/413,335, entitled "METHOD AND APPARATUS FOR REQUESTING AND SHARING NETWORK PERFORMANCE INFORMATION (NPI)" which was filed Nov. 12, 2010. This application claims the benefit of U.S. Provisional Patent application Ser. No. 61/450,524, entitled "METHOD AND APPARATUS FOR REQUESTING AND SHARING NETWORK PERFORMANCE INFORMATION (NPI)" which was filed Mar. 8, 2011. The entirety of the aforementioned applications is herein incorporated by reference.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals, also referred to as user equipment (UE) or mobile node (MN). Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

To supplement conventional mobile phone network base stations, also referred to as macro network base stations, additional base stations may be deployed to provide more robust wireless coverage to mobile planned service areas. For example, wireless relay stations and small-coverage base stations (e.g., commonly referred to as access point base stations, picocells, Home NodeBs (HNBs), femto access points, or femto cells) may be deployed for incremental capacity growth, richer user experience, and in-building coverage. Typically, such small-coverage base stations are connected to the Internet and the mobile operator's network via a DSL router or cable modem. As these other types of base stations may be added to the conventional mobile phone network (e.g., the backhaul) in a different manner than conventional base stations (e.g., macro base stations), there is a need for effective techniques for managing these other types of base stations and their associated user equipment.

For a multi-radio terminal, it is desirable that IP flows may be mapped to available radio resources. One essential input parameter for attempting to optimize the IP flows is the Network Performance Information (NPI). For example, it would not be desirable to switch to a Wireless Local Area Network (WLAN) interface if it is congested and will perform worse than an available cellular interface. Discovering NPI may be achieved by the terminal sending or receiving traffic over WLAN interface. However, both of these operations consume time, power and network resources. Moreover, the terminal cannot reliably predict the performance of a scheduled cellular system such as Evolution-Data Optimized or High Speed Packet Access systems, and thus a particular traffic model A cannot be used to predict performance for a traffic model B. Thus, it would be desirable for a terminal to be able to obtain NPI from other nodes directly

SUMMARY

The following presents a simplified summary of one or more aspects of a method and apparatus for method and apparatus for requesting and sharing network performance information (NPI). This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to apparatus and methods that provide wireless communications, where a method for wireless communications includes determining network performance; and sharing NPI with a network node; wherein the NPI comprises information necessary for the network node to determine the performance available on a network.

In another aspect a method for wireless communications includes determining a set of parameters that govern network performance; and sharing the set of parameters with a network node; wherein the set of parameters comprises information necessary for the network node to compute the performance of its communication over a network In yet another aspect, an apparatus for wireless communications is provided that includes means for determining network performance; and means for sharing NPI with a network node; wherein the NPI comprises information necessary for the network node to determine the performance available on a network.

In yet another aspect, an apparatus for wireless communications is provided that includes means for determining a set of parameters that govern network performance; and means for sharing the set of parameters with a network node; wherein the set of parameters comprises information necessary for the network node to compute the performance of its communication over a network.

In yet another aspect, a computer-program product for wireless communications is provided that includes a machine-readable medium including instructions executable to determine network performance; and share NPI with a network node; wherein the NPI comprises information necessary for the network node to determine the performance available on a network.

In yet another aspect, a computer-program product for wireless communications is provided that includes a machine-readable medium including instructions executable to determine a set of parameters that govern network performance; and share the set of parameters with a network node; wherein the set of parameters comprises information necessary for the network node to compute the performance of its communication over a network.

In yet another aspect, an apparatus for wireless communications is provided that includes an antenna; and a processor coupled to the antenna, the processor configured to determine network performance; and share NPI with a network node; wherein the NPI comprises information necessary for the network node to determine the performance available on a network.

In yet another aspect, an apparatus for wireless communications is provided that includes an antenna; and a processor coupled to the antenna, the processor configured to determine a set of parameters that govern network performance; and share the set of parameters with a network node; wherein the set of parameters comprises information necessary for the network node to compute the performance of its communication over a network.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It is understood, however, that such aspect(s) may be practiced without these specific details.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As a mobile node, also referred to as an access terminal ("AT"), moves through such a network, it may be served in certain locations by access nodes ("ANs", also referred to interchangeably as Node Bs or base stations) that provide macro coverage while the access terminal may be served at other locations by access nodes that provide smaller scale coverage. In some aspects, the smaller scale coverage nodes may be used to provide incremental capacity growth, in-building coverage, and different services (e.g., for a more robust user experience). In the discussion herein, a node that provides coverage over a relatively large area may be referred to as a macro node, or Node B. A node that provides coverage over a relatively small area (e.g., a residence) may be referred to as a femto node, or home node B. A cell associated with a macro node or a femto node may be referred to as a macro cell or a femto cell (or "femtocell"), respectively. In some implementations, each cell may be further associated with (e.g., divided into) one or more sectors.

In various applications, other terminology may be used to reference a macro node or a femto node. For example, a macro node may be configured or referred to as an access node, base station, access point, Node B, evolved Node B (eNode B), macro cell, and so on. Also, a femto node may be configured or referred to as a Home Node B, Home eNode B, access point base station, femtocell, femto access point, and so on.

One aspect of the disclosed methods is related to sharing Network Performance Information (NPI) to facilitate radio interface selection for a multi-radio terminal. Another aspect is related to NPI requests to facilitate radio interface selection for a multi-radio terminal. Yet another aspect is related to a generic request/response message architecture allowing a terminal to discover what network performance it would experience if a given IP flow was added to its flows, such as available bit rate headroom or maximum latency at a given throughput. The response is prepared by a radio access node and takes scheduling considerations into account.

As further described herein, NPI may encompass information about one or more of the following parameters, including:

backhaul or Radio Access Network (RAN);
uplink or downlink; and/or
latency, bitrate or packet loss rate.

For example, a particular NPI may include information about the RAN, downlink, and bitrate. In general, the NPI may be estimated by an access terminal or by an access node. The NPI may be used by a multi-radio device to efficiently utilize a suitable set of its radio interfaces.

Figure 1:
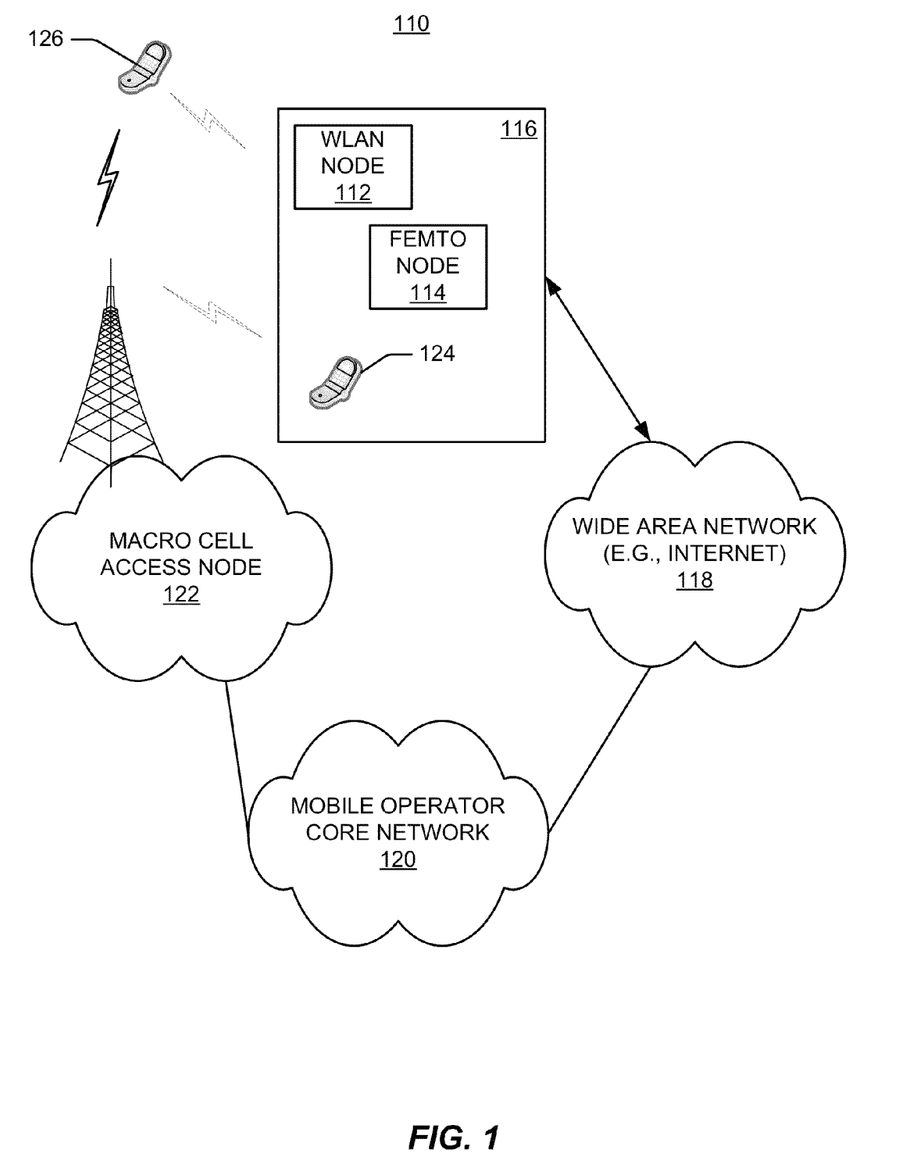
FIG. 1 is a schematic diagram of an aspect of a network environment in which an aspect for Network Performance Information (NPI) request/sharing may be implemented.

FIG. 1 illustrates, in one exemplary aspect that should not be construed as limiting, a communication system in which NPI request and sharing approaches may be taken, where one or more nodes are deployed within a network environment 110. Specifically, the network 110 includes multiple network nodes, such as WLAN nodes 112 and femto nodes or HNB 114, installed in a relatively small scale network environment 116, such as in one or more user residences. Each node 112 and 114 may be coupled, such as via one or more of a DSL router, a cable modem, a wireless link, or other connectivity mechanism, to a wide area network 118 (e.g., the Internet), which in turn is communicatively linked to a mobile operator core network 120, and a macro cell access node 122. As will be discussed below, each node 112 and 114 may be configured to serve one or more access terminals, such as associated or member access terminal 124, and, optionally, alien or non-member access terminal 126. In other words, access to nodes 112 and 114 may be restricted whereby a given access terminal 124 or 126 may be served by a one or more designated (e.g., home) node(s) but may not be served by any non-designated nodes (e.g., a neighbor's node).

Figure 2:
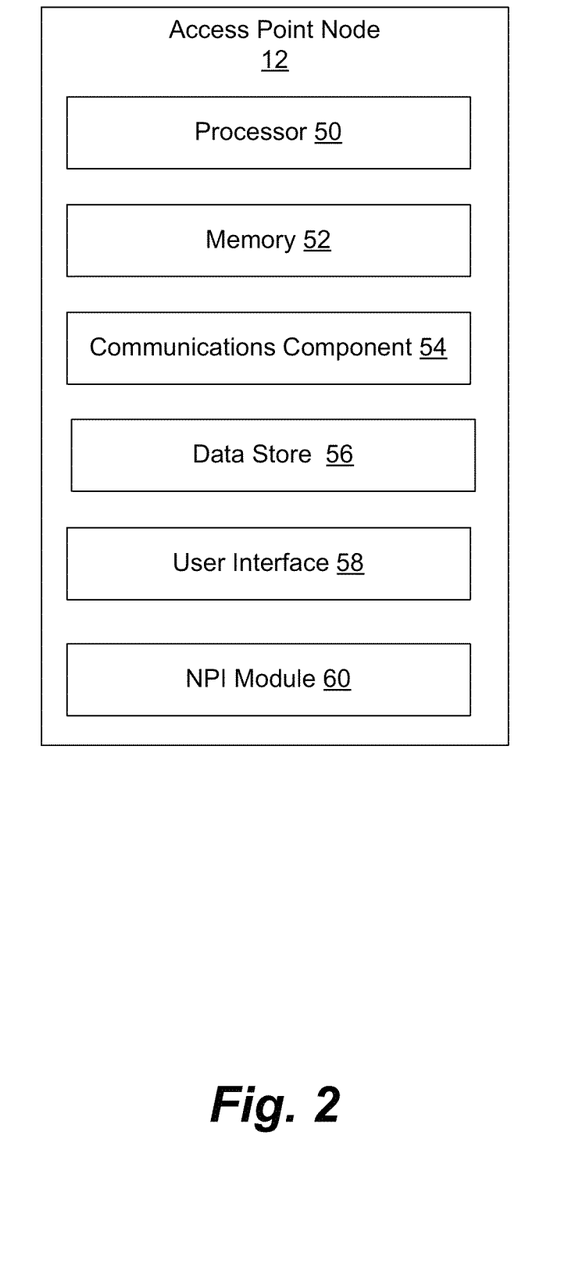
FIG. 2 is a schematic diagram of an aspect of an access point node of FIG. 1.

Referring to FIG. 2, in one aspect, a femto or WLAN node may be implemented as an access point node 12, that may include a processor 50 for carrying out processing associated with one or more of components or functions described herein. Processor 50 may include a single or multiple sets of processors or multi-core processors. Moreover, processor 50 can be implemented as an integrated processing system and/or a distributed processing system.

Access point node 12 may further include a memory 52, such as for storing local versions of applications being executed by processor 50. Memory 52 can include any type of memory usable by a computer, such as random access memory (RAM), read only memory (ROM), tapes, magnetic discs, optical discs, volatile memory, non-volatile memory, and any combination thereof.

Further, access point node 12 may include a communications component 54 that provides for establishing and maintaining communications with one or more other components of system 10 (FIG. 1), for example, utilizing hardware, software, and services as described herein. Communications component 54 may carry communications between components on access point node 12, as well as between access point node 12 and external devices, such as devices located across a communications network and/or devices serially or locally connected to access point node 12. For example, communications component 54 may include one or more buses, and may further include transmit chain components and receive chain components, respectively including one or more transmitters and receivers, or transceivers, operable for interfacing with external devices.

Additionally, access point node 12 may further include a data store 56, which can be any suitable combination of hardware and/or software, that provides for mass storage of information, databases, and programs employed in connection with aspects described herein. For example, data store 56 may be a data repository for applications not currently being executed by processor 50.

Access point node 12 may additionally include a user interface component 58 operable to receive inputs from a user of access point node 12, and further operable to generate outputs for presentation to the user. User interface component 58 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 58 may include one or more output devices, including but not limited to a display, a speaker, a haptic feedback mechanism, a printer, any other mechanism capable of presenting an output to a user, or any combination thereof.

Access point node 12 further includes an NPI module 60, which will be further described herein. In general, the NPI module 60 is used by the access point node 12 to obtain and store NPI, as well as share NPI to any nodes that request the information.

Figure 3:
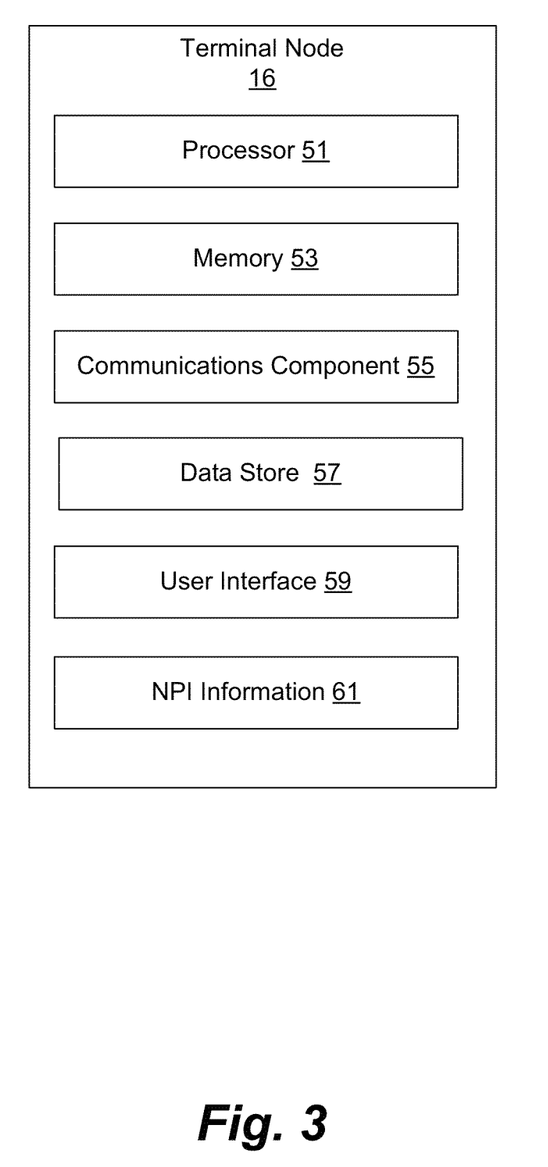
FIG. 3 is a schematic diagram of an aspect of a terminal node of FIG. 1.

Referring to FIG. 3, in one aspect, an access terminal may be implemented as an access terminal node 16, which may include a processor 51 for carrying out processing associated with one or more of components or functions described herein. Processor 51 may include a single or multiple sets of processors or multi-core processors. Moreover, processor 51 can be implemented as an integrated processing system and/or a distributed processing system.

Access terminal node 16 may further include a memory 53, such as for storing local versions of applications being executed by processor 51. Memory 53 can include any type of memory usable by a computer, such as random access memory (RAM), read only memory (ROM), tapes, magnetic discs, optical discs, volatile memory, non-volatile memory, and any combination thereof.

Further, access terminal node 16 may include a communications component 55 that provides for establishing and maintaining communications with one or more other components of system 10, for example, utilizing hardware, software, and services as described herein. Communications component 55 may carry communications between components on access terminal node 16, as well as between access terminal node 16 and external devices, such as devices located across a communications network and/or devices serially or locally connected to access terminal node 16. For example, communications component 55 may include one or more buses, and may further include transmit chain components and receive chain components, respectively including one or more transmitters and receivers, or transceivers, operable for interfacing with external devices.

Additionally, access terminal node 16 may further include a data store 57, which can be any suitable combination of hardware and/or software, that provides for mass storage of information, databases, and programs employed in connection with aspects described herein. For example, data store 57 may be a data repository for applications not currently being executed by processor 51.

Access terminal node 16 may additionally include a user interface component 59 operable to receive inputs from a user of access terminal node 16, and further operable to generate outputs for presentation to the user. User interface component 59 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 59 may include one or more output devices, including but not limited to a display, a speaker, a haptic feedback mechanism, a printer, any other mechanism capable of presenting an output to a user, or any combination thereof.

One subject of this disclosure is a method to request/indicate NPI in case a specified flow is added to the connection of a given terminal. For example, if a terminal has 0, 1, . . . , n flows ongoing, and requests NPI in case an additional flow n+1 was added, a Node B or central controller in the RAN may predict the NPI and respond to the terminal. Further, the terminal may already associated with the AP, but may have no ongoing flows.

In order to perform smart interface selection, there is a need for the terminal to know how a particular radio interface would react with additional flows. For example, it would be useful for the terminal to know:

how much more traffic it could fit (i.e., leftover bitrate);
how delay would be affected;
if packet loss would occur; or
other information specific to each terminal In general, a terminal cannot estimate reliably how it would be served if more IP flows were added to this radio interface. For example, the terminal cannot estimate maximum DL/UL bitrate based on observations made while DL/UL queues are not full. Thus, for example, the terminal would not be able to guess the rate of a FTP session based on a chat session.

There may be many reasons why the terminal cannot reliably estimate what would happen if more IP flows were added, including:

the behavior of the scheduler is unknown (the scheduler may handle terminals differently based on profiles, consumed data volume, roaming, etc.);
the terminal may not be able to observe how other stations are scheduled;
the terminal does not know if other stations have full DL/UL queues;
the terminal may not know how many other stations are being served; and
the terminal may not be able to reliably detect the spectrum utilization.

Because each terminal may experience a different network performance, in a scheduled system the entity scheduling jointly with core network elements can predict the maximum network performance available for a terminal. In one approach, a message for the terminal to inquire about maximum network performance for itself is considered. Alternatively, a message may be used to inquire about network performance in case a new flow is added. The network will respond to the message with maximum network performance for this particular terminal in these radio conditions. The parameters can include any of the NPI described herein.

Figure 4:
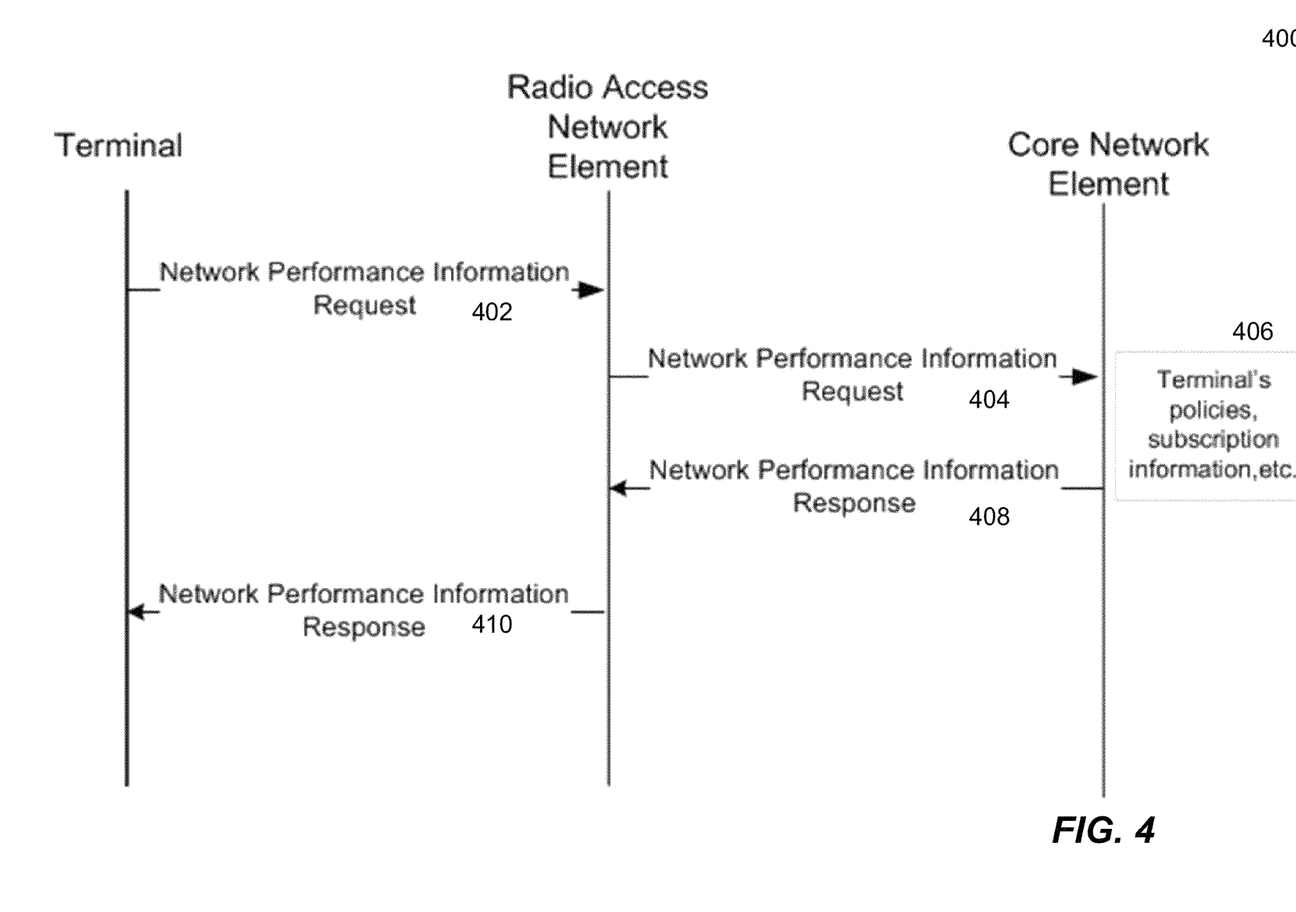
FIG. 4 is a message diagram showing an NPI request/response process.

FIG. 4 illustrates an NPI request and response messaging sequence 400, where at 402 a terminal sends an NPI request to a RAN element. Based on this request from the terminal, at 404 the radio access network element will also send an NPI request to a core network element at 406. The core network element at 406 includes subscriber information, which may include information that apply to the terminal, including security and other policies; subscription information; usage/quota information; and other information. The radio access network element includes performance information that applies to the terminal, which includes radio resource performance; load, and other information. The information that is received from the core network element at 408 is combined with the information on the radio access network element to create an NPI response to the terminal at 410.

In one aspect of the disclosure, one node may be used to estimate NPI and a communication protocol is used to exchange that information with other nodes. Accurate NPI estimation may consume network resources or power. With the approaches described herein, accurate estimation may be performed only by selected nodes in the network. Other nodes use the NPI upon either being already connected to that network and starting a new IP flow, or while evaluating the benefit of starting to use this network/radio interface when the terminal is already using one or more other network/radio interfaces.

In one approach, the access network equipment performs NPI estimates. The equipment may be: a WLAN access point, a femto box, an eNB, etc. The access point may periodically broadcast relevant NPI estimate. In another aspect, the access point may transmit the relevant NPI estimate directly to a node. The access point may transmit or broadcast the information in response to access probes. In WLANs, an active scan is more power efficient than a passive scan. Thus, a node in the network estimates network performance, and communication protocols enable sharing this information. Both stations that are already connected to, as well as stations not yet connected (i.e., associated) with the network may receive this information.

The following information may be especially relevant for the access point in a WLAN to broadcast:

current load on the backhaul (e.g., Digital Subscriber Line (DSL)/cable link), for uplink and downlink (unit: bit/s);
total capacity of the backhaul, for uplink and downlink (unit: bit/s); and
leftover capacity on the backhaul, for uplink and downlink (unit: bit/s).

The determined network performance also needs to account for non-wireless technology such as DSL, cable, and other modems, and is not limited to wireless protocols. For example, the approach is used between the cable modem and access point to inform the access point of the cable modem's link capacity, in situations where the access point and the cable modem are two different devices. The availability of backhaul information is important for application such as cellular offload because the information provides better support for proper interface selection. Significant efforts in 3GPP and 3GPP2 are being made to support mobility of IP flows between cellular and WLAN networks. IEEE 802.11 access points promise network throughput on the order of hundreds of megabit-per-second, but may be backhaul limited. For example, a backhaul rate for a home access point may only be 10 megabits-per-second (Mbps) and advanced cellular connection promise greater than 10 Mbps. Further, these backhauls may be shared by multiple devices. Existing network load indicators do not account for this backhaul limitation. Thus, based on existing load indicators, interface selection may result in lower throughput because the selection is based on incomplete information.

For example, continuing with the previous case where the backhaul is only 10 Mbps, but further assume that a terminal estimates that there is a 250 Mbps air link capacity in the WLAN. If the estimated cellular capacity is 20 Mbps, the terminal will select the use of the WLAN interface because the terminal will select the higher link capacity. However, the actual capacity experienced by the terminal is limited to less than 10 Mbps due to backhaul bandwidth limitation. Thus, terminals need to account for medium and backhaul load for interface selection, and the broadcasting of the backhaul load information assists in this endeavor.

Figure 5:
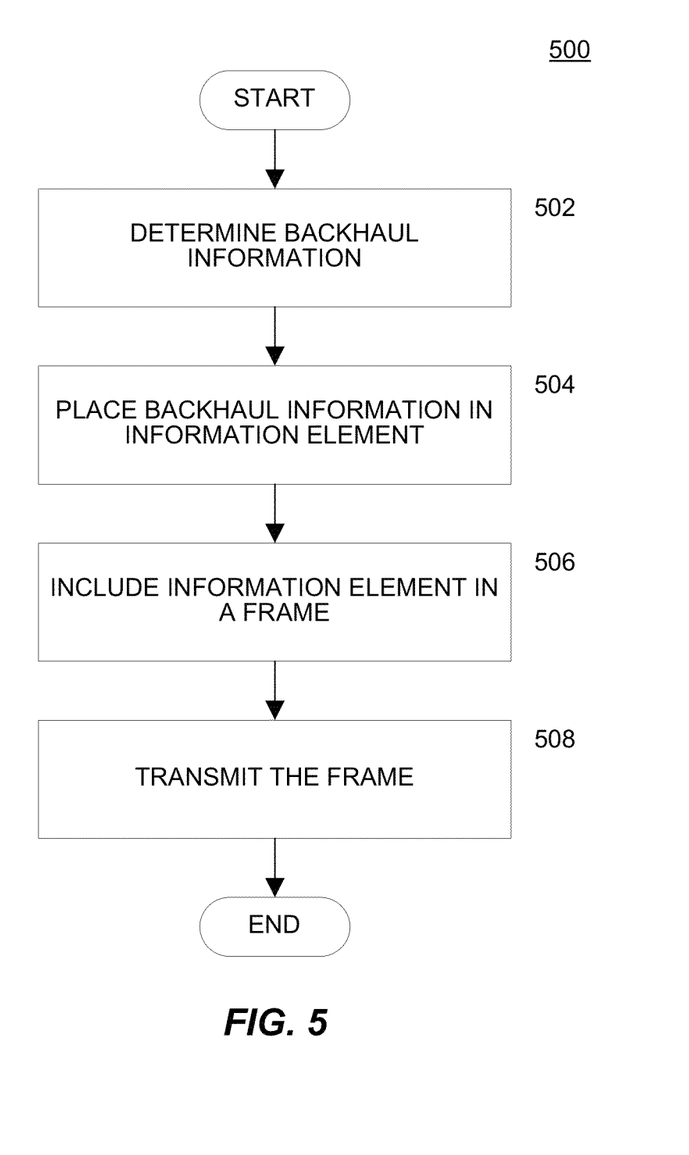
FIG. 5 is a flow diagram of an NPI broadcasting process.

FIG. 5 illustrates a backhaul information broadcast process 500 configured in accordance with one aspect of the NPI sharing approach, where at 502, an access point determines backhaul information such as backhaul capacity described above. At 504, the access point will place the backhaul information in an information element. At 506, the information element may be included in any one of these existing frames:

a beacon frame such as that defined by IEEE 802.11 frame format 8.3.3.2;

a probe response such as that defined by IEEE 802.11 frame format 8.3.3.10; or an action frame such as that defined by IEEE 802.11 frame format 8.3.3.13-8.3.3.14.

In another aspect of the information element construction, a new frame format may also be used. At 508, the access point will broadcast the information element.

Figure 6:
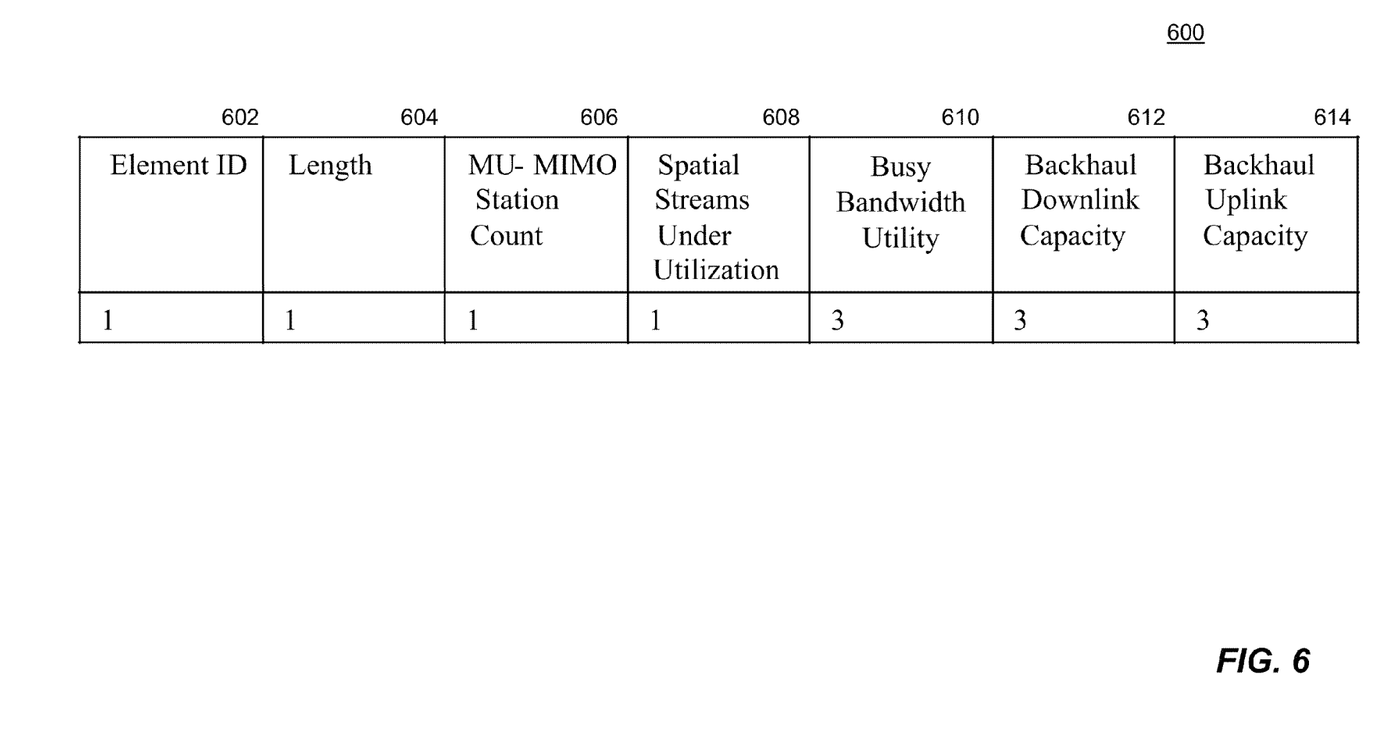
FIG. 6 is a diagram of an information element utilized in the NPI broadcasting process of FIG. 5.

FIG. 6 is a diagram of an information element frame 600 that may be used in the NPI broadcast process 500. In one aspect of the NPI broadcast process, the information element 600 comprises an element ID field 602, a length field 604, a Multi-User MIMO (MU-MIMO) station count field 606, a spatial streams under utilization field 608, a busy bandwidth utility field 610, a backhaul downlink capacity field 612, and a backhaul uplink capacity field 614. The element ID field 602 uniquely identifies the information element frame 600. The length field 604 indicates the length of the information element frame 600. The MU-MIMO station count field 606 indicates the number of associated MIMO stations. The spatial streams under utilization field 608 indicates the number of spatial streams that is being utilized. The busy bandwidth utility field 610 indicates the portion of the transmission rate used in the transport of the total traffic load. The backhaul downlink capacity field 612 provides information to the terminals about the downlink capacity of the WLAN, and a backhaul uplink capacity field 614 provides information to the terminals about the uplink capacity of the WLAN. Each of the fields is of a certain size, as indicated by the number below each field title.

Regarding UMTS, the following may be especially relevant for the NB to broadcast:

noise figure at the NB (N_0);

maximum RoT at the NB;

average code utilization on the downlink (e.g., HS-PDSCH), which is how much headroom is left;

number of downlink (e.g., HSDPA) and uplink (e.g., HSUPA) carriers; and maximum data rate (MCS) supported on each carrier, for both downlink and uplink.

In one aspect of the disclosed approaches, for downlink rate estimation for UMTS, a database tracks and stores MPO, CQI table, and effective number of UEs. The first two quantities are available in Cell_DCH state, and the last one is estimated in Cell_DCH state. In one approach for downlink rate estimation for UMTS, a UE measures CPICH channel and calculates CQI. This may be based on MPO. The CQI is mapped to maximum throughput, which in one approach is based on CQI tables. For example, channel quality information is used to map to a data rate. Lastly, available throughput is given by maximum throughput/effective number of UEs.

In one approach for uplink rate estimation for UMTS, a UE estimates its local $No_{UE}$, from which UE infers Node B $No_{NodeB}$. The estimate may be a few dB off. The UE assumes a certain rise over thermal target ($RoT_{target}$) of Node B. This parameter depends on Node B implementation and may be different from vendor to vendor. The procedure may involve the UE reading Io from SIB. The UE calculates used $ROT_{used}$=Io/$NO_{NodeB}$, where $No_{NodeB}$ is the noise at Node B. The UE calculates availabe $RoT_{avail}$=$ROT_{target}$−$ROT_{used}$, where $RoT_{target}$ is a metric for UE to calculate for its own NPI. UE calculates power-headroom is limited $RoT_{powerlimited}$=$P_{max}$−PL−No (all calculation may be performed in dB), where $P_{max}$ is maximum transmit power, PL is the path loss and No is the noise figure of the terminal. Finally, in one aspect of the disclosure, Rate=3.84*$\log_2$(1+min(Ro-$T_{avail}$, $RoT_{powerlimited}$)) Mbps. The information that is sent is not the actual bitrate estimate, but information that allows the UE to calculate bitrate estimates.

Figure 7:
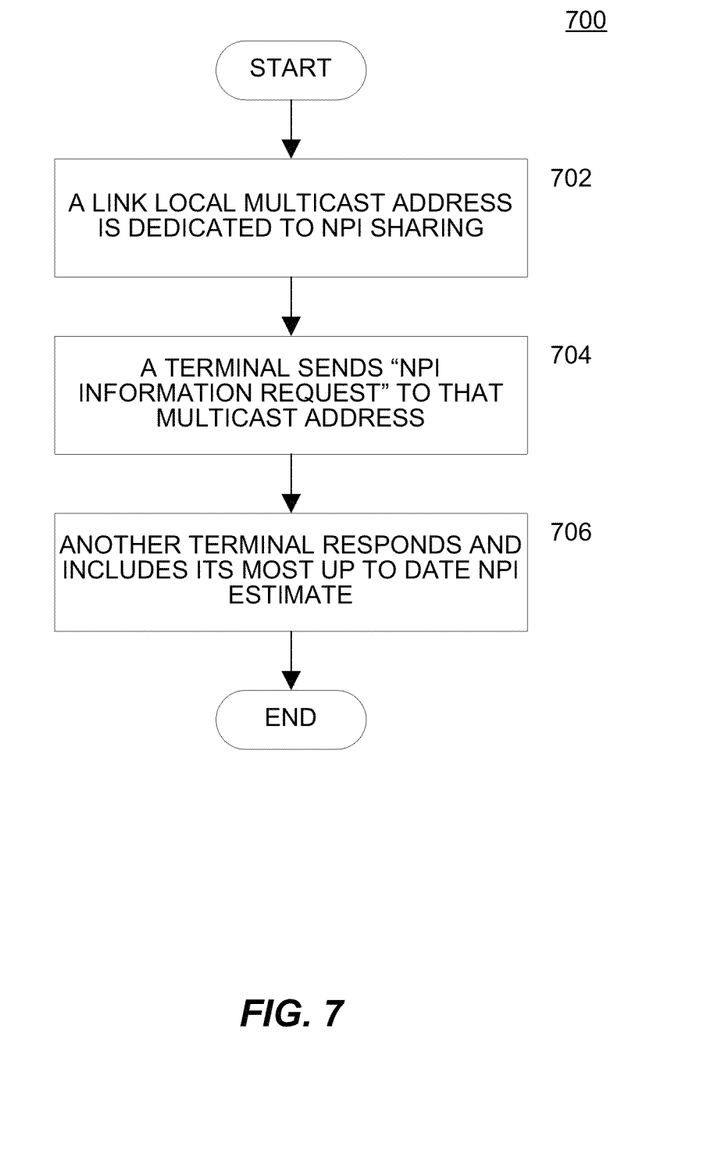
FIG. 7 is a flow diagram of a peer-to-peer NPI sharing process.

In another approach, a peer-to-peer protocol is defined for sharing NPI among members of a network. In this scenario, the terminal is already connected to that network. However, instead of actively probing for NPI, which will cause additional send/receive traffic, the terminal obtains NPI estimates from its peers. FIG. 7 illustrates a peer-to-peer NPI sharing process. In step 702, a specific local multicast address may be allocated for such purpose. For example, a link local multicast address may be dedicated to NPI sharing. In step 704, a terminal sends an "NPI information request" to the multicast address. Then, in step 706, another terminal responds and includes its most up-to-date NPI estimate.

Requesting NPI directly from another terminal may be more power efficient than when the terminal performs estimation by itself. Sharing NPI also reduces load that is due to having each terminal performing its own estimation. Performance information becomes available without "probing". Having NPI may allow the terminal to accelerate/optimize selection of a radio network interface because NPI is available sooner. Obtaining NPI from another source may also provide the terminal with more information than it could obtain by itself. For example, the WLAN AP can measure the backhaul Round Trip Time (RTT), while the station can only measure the combined backhaul and WLAN RTT.

In general, a terminal cannot predict network performance for a scheduled network for the addition of a flow A based on observing the network before that flow is served. Indeed, in most scheduled systems, such as cellular systems, the scheduler is left to network vendor implementation. Moreover, the terminal may be subject to policies of which it is unaware, including core network rate limitations. Hence, a dedicated signaling is proposed herein that allows the terminal to ask the scheduler specifically what network performance would be experienced by the terminal if a given flow is added. The terminal may also request information about available bitrate headroom. The terminal may further determine maximum latency at a given throughput. The disclosed methods allow terminals to reliably discover if a new flow would be served properly on a particular radio interface. Further, the disclosed methods allow terminals to discover the above without sending "sample data" or "probes" over that radio interface, which waste time, power, and network resources.

The disclosed embodiments also describe methods for a terminal to detect WLAN NPI. In one aspect of the disclosure, a first set of methods is used when no WLAN traffic is currently being transported by the terminal. A second set of methods is designed for use when there is ongoing WLAN traffic. In general, all the operations/notation is applicable to both uplink and downlink operations. Downlink operations are used in the examples, but they are equally applicable to uplink operations, with the appropriate change of variables.

When there is no traffic being transported by the terminal on WLAN, but there is some trigger that has lead the terminal to search for a WLAN and at least one WLAN has been found, assuming at least one other data network is available, the terminal must select one among these networks to start that first flow. While a search may have happened previously, in one aspect of the disclosed approach it is assumed that the selection occurs after the socket on the terminal issues a call to send a first packet. Thus, the duration available to perform evaluation of WLAN performance is short and may be on the order of a single second. In another approach, the quality of a found WLAN is monitored periodically, until a request to associate arrives at a later point. The periodic monitoring shall consume a minimum amount of power. The goal is to deliver an estimate throughput available on downlink and uplink. The throughput available depends on which link is, or will be, the bottleneck, hence the first step is to locate the potential bottleneck.

In order to determine if the backhaul is the bottleneck, the terminal may need information on the network topology. The following cases are possible:

1) only WLAN stations are attached to the backhaul (e.g., enterprise or pure WLAN hotspot environments);

2) WLAN and LAN stations are attached to the backhaul (e.g., home environments); or 3) WLAN, LAN and a femto are attached to the backhaul.

With regard to case 1, the terminal can determine backhaul load by only observing and classifying WLAN traffic into Internet and local traffic. Here the terminal may sense the traffic over the WLAN to discover the Internet/local composition. In case 2, the terminal needs to know at least how much traffic is destined for the LAN. For case 3, the terminal needs to know at least how much traffic is going to the LAN and the femto.

Figure 8:
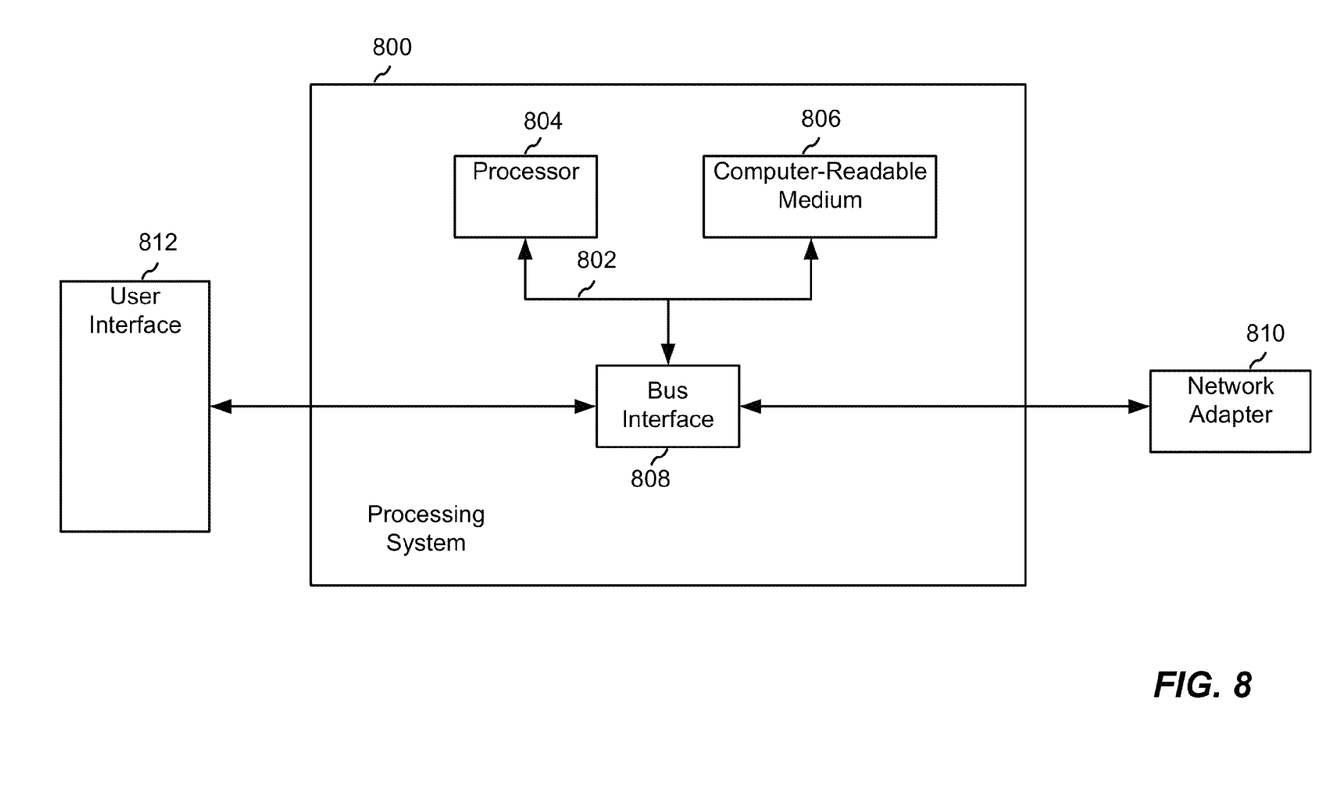
FIG. 8 is a block diagram of an apparatus that includes a processing system.

FIG. 8 illustrates an example of a hardware configuration for a processing system 800 in a wireless node. In this example, the processing system 800 may be implemented with a bus architecture represented generally by bus 802. The bus 802 may include any number of interconnecting buses and bridges depending on the specific application of the processing system 800 and the overall design constraints. The bus links together various circuits including a processor 804, computer-readable media 806, and a bus interface 808. The bus interface 808 may be used to connect a network adapter 810, among other things, to the processing system 800 via the bus 802. The network interface 810 may be used to implement the signal processing functions of the PHY layer. A user interface 812 (e.g., keypad, display, mouse, joystick, etc.) may also be connected to the bus via the bus interface 808. The bus 802 may also link various other circuits such as timing sources, peripherals, voltage regulators, power management circuits, and the like, which are well known in the art, and therefore, will not be described any further.

The processor 804 is responsible for managing the bus and general processing, including the execution of software stored on the computer-readable media 808. The processor 808 may be implemented with one or more general-purpose and/or special-purpose processors. Examples include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In the hardware implementation illustrated in FIG. 8, the computer-readable media 806 is shown as part of the processing system 800 separate from the processor 804. However, as those skilled in the art will readily appreciate, the computer-readable media 806, or any portion thereof, may be external to the processing system 800. By way of example, the computer-readable media 806 may include a transmission line, a carrier wave modulated by data, and/or a computer product separate from the wireless node, all which may be accessed by the processor 804 through the bus interface 808. Alternatively, or in addition to, the computer readable media 804, or any portion thereof, may be integrated into the processor 804, such as the case may be with cache and/or general register files.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communications, comprising:
receiving a request, from a user terminal, to predict network performance information (NPI) based at least in part on adding at least one data flow in a connection between the user terminal and at least one of multiple networks over an access point;
receiving performance information related to a backhaul of the access point;
predicting, in response to the request and based at least in part on the performance information, the NPI of the at least one of the multiple networks based at least in part on one or more ongoing data flows existing for the connection between the user terminal and the at least one of the multiple networks over the access point and in response to the at least one data flow added to the connection between the at least one of the multiple networks and the user terminal over the access point; and
sharing the NPI with one or more network nodes, wherein the NPI comprises information for the user terminal to determine a performance of communications associated with the user terminal and the at least one of the multiple networks over the one or more ongoing data flows and the at least one data flow, wherein the sharing is performed in response to addition of the at least one data flow to the connection.

2. The method of claim 1, wherein the NPI comprises at least one of latency information, bitrate information, current load information, total capacity information, leftover capacity information, or packet loss rate information for a communications resource on at least one of the multiple networks.

3. The method of claim 2, wherein the communications resource comprises at least one of a backhaul or radio access network.

4. The method of claim 1, wherein the predicting is based on information received from a user terminal.

5. The method of claim 1, wherein the predicting is further based at least in part on subscriber information of the user terminal.

6. The method of claim 1, wherein the sharing of the NPI comprises broadcasting the NPI to an access point.

7. The method of claim 6, wherein the access point covers the user terminal.

8. The method of claim 6, wherein the broadcasting occurs in pre-determined time intervals.

9. The method of claim 1, wherein the sharing of the NPI comprises forwarding the NPI to the user terminal.

10. The method of claim 1, wherein the sharing of the NPI comprises sharing the NPI between at least two user terminals.

11. The method of claim 1, wherein sharing of the NPI comprises:
receiving a request from the user terminal for the NPI; and
transmitting the NPI in response from the request.

12. The method of claim 1, wherein sharing the NPI comprises:
creating an information element based on the NPI;
inserting the information element into a frame; and
transmitting the frame.

13. A method for wireless communications, comprising:
receiving a request, from a user terminal, to predict network performance based at least in part on adding at least one data flow in a connection between the user terminal and at least one of multiple networks over an access point;
receiving performance information related to a backhaul of the access point;
predicting, in response to the request and based at least in part on the performance information, a set of parameters that govern the network performance between multiple networks based at least in part on one or more ongoing data flows existing for the connection between the user terminal and the at least one of the multiple networks over the access point and in response to the at least one data flow added to the connection between the at least one of the multiple networks and the user terminal over the access point; and
sharing the set of parameters with a network node in response to addition of the at least one data flow to the connection, wherein the set of parameters comprises information for the network node to determine a performance of communications associated with the network node over each network of the multiple networks.

14. The method of claim 13, wherein the network node comprises a user terminal.

15. The method of claim 13, wherein the set of parameters comprises one of:
a noise figure at a Node B;
a target Rise over Thermal at the Node B;
average use of OVSF codes on a high speed downlink packet access channel;
an indicator of whether 64 QAM modulation is supported at the Node B;
an indicator of whether MIMO is supported at the Node B;
an indicator of whether Multi-Carrier is supported at the Node B;
a maximum transport block size supported by the Node B for uplink and downlink;
an average time/frequency resource utilization for an extended Node B; or
a maximum number of bits configured to transmit/receive in a time transmit interval for the extended Node B.

16. An apparatus for wireless communications, comprising:
- means for receiving a request, from a user terminal, to predict network performance information (NPI) based at least in part on adding at least one data flow in a connection between the user terminal and at least one of multiple networks over an access point;
- means for receiving performance information related to a backhaul of the access point;
- means for predicting, in response to the request and based at least in part on the performance information, the NPI of the at least one of the multiple networks based at least in part on one or more ongoing data flows existing for the connection between the user terminal and the at least one of the multiple networks over the access point and in response to the at least one data flow added to the connection between the at least one of the multiple networks and the user terminal over the access point; and
- means for sharing the NPI with one or more network nodes in response to addition of the at least one data flow to the connection, wherein the NPI comprises information for the user terminal to determine a performance of communications associated with the user terminal and the at least one of multiple networks over the one or more ongoing data flows and the at least one data flow.

17. The apparatus of claim 16, wherein the NPI comprises at least one of latency information, bitrate information, current load information, total capacity information, leftover capacity information, or packet loss rate information for a communications resource on at least one of the multiple networks.

18. The apparatus of claim 17, wherein the communications resource comprises at least one of a backhaul or radio access network.

19. The apparatus of claim 16, wherein the means for predicting is based on information received from a user terminal.

20. The apparatus of claim 16, wherein the means for predicting is based at least in part on subscriber information of the user terminal.

21. The apparatus of claim 16, wherein the means for sharing the NPI comprises means for broadcasting the NPI to an access point.

22. The apparatus of claim 21, wherein the access point covers the user terminal.

23. The apparatus of claim 21, wherein the broadcasting occurs in pre-determined time intervals.

24. The apparatus of claim 16, wherein the means for sharing the NPI comprises means for forwarding the NPI to the user terminal.

25. The apparatus of claim 16, wherein the means for sharing the NPI comprises sharing the NPI between at least two user terminals.

26. The apparatus of claim 16, wherein the means for sharing of the NPI comprises:
- means for receiving a request from the user terminal for the NPI; and
- means for transmitting the NPI in response from the request.

27. The apparatus of claim 16, wherein the means for sharing the NPI comprises:
- means for creating an information element based on the NPI;
- means for inserting the information element into a frame; and
- means for transmitting the frame.

28. An apparatus for wireless communications, comprising:
- means for receiving a request, from a user terminal, to predict network performance based at least in part on adding at least one data flow in a connection between the user terminal and at least one of multiple networks over an access point;
- means for receiving performance information related to a backhaul of the access point;
- means for predicting, in response to the request and based at least in part on the performance information, a set of parameters that govern the network performance between multiple networks based at least in part on one or more ongoing data flows existing for the connection between the user terminal and the at least one of the multiple networks over the access point and in response to the at least one data flow added to the connection between the at least one of the multiple networks and the user terminal over the access point; and
- means for sharing the set of parameters with a network node in response to addition of the at least one data flow to the connection, wherein the set of parameters comprises information for the network node to determine a performance of communications associated with the network node over each network of the multiple networks.

29. The apparatus of claim 28, wherein the network node comprises a user terminal.

30. The apparatus of claim 28, wherein the set of parameters comprises one of:
- a noise figure at a Node B;
- a target Rise over Thermal at the Node B;
- average use of OVSF codes on a high speed downlink packet access channel;
- an indicator of whether 64 QAM modulation is supported at the Node B;
- an indicator of whether MIMO is supported at the Node B;
- an indicator of whether Multi-Carrier is supported at the Node B;
- a maximum transport block size supported by the Node B for uplink and downlink;
- an average time/frequency resource utilization for an extended Node B; or
- a maximum number of bits configured to transmit/receive in a time transmit interval for the extended Node B.

31. A computer-program product for wireless communications, comprising:
- a non-transitory machine-readable medium comprising instructions executable to:
  - receive a request, from a user terminal, to predict network performance information (NPI) based at least in part on adding at least one data flow in a connection between the user terminal and at least one of multiple networks over an access point;
  - receive performance information related to a backhaul of the access point;
  - predict, in response to the request and based at least in part on the performance information, the NPI of the at least one of the multiple networks based at least in part on one or more ongoing data flows existing for the connection between the user terminal and the at least one of the multiple networks over the access point and in response to the at least one data flow added to the connection between the at least one of the multiple networks and the user terminal over the access point; and share the NPI with one or more network nodes in response to addition of the at least one data flow to the connection, wherein the NPI comprises information for the user terminal to determine a performance of communications associated with the user terminal and the at least one of multiple networks over the one or more ongoing data flows and the at least one data flow.

32. The computer-program product of claim 31, wherein the NPI comprises at least one of latency information, bitrate information, current load information, total capacity information, leftover capacity information, or packet loss rate information for a communications resource on at least one of the multiple networks.

33. The computer-program product of claim 32, wherein the communications resource comprises at least one of a backhaul or radio access network.

34. The computer-program product of claim 31, wherein the instructions executable for predicting NPI comprise instructions executable to predict NPI via a user terminal.

35. The computer-program product of claim 31, wherein the instructions executable for predicting NPI comprise instructions executable to predict NPI via an access node.

36. The computer-program product of claim 31, wherein the machine-readable medium further comprises instructions executable to broadcast the NPI to the access point.

37. The computer-program product of claim 36, wherein the access point covers the user terminal.

38. The computer-program product of claim 36, wherein the broadcasting occurs in pre-determined time intervals.

39. The computer-program product of claim 31, wherein the machine-readable medium further comprises instructions executable to forward the NPI to the user terminal.

40. The computer-program product of claim 31, wherein the machine-readable medium further comprises instructions executable to share the NPI between at least two user terminals.

41. The computer-program product of claim 31, wherein the instructions executable for sharing of the NPI comprise instructions executable to:
receive a request from the user terminal for the NPI; and
transmit the NPI in response from the request.

42. The computer-program product of claim 31, wherein the instructions executable for sharing the NPI comprise instructions executable to:
create an information element based on the NPI;
insert the information element into a frame; and
transmit the frame.

43. A computer-program product for wireless communications, comprising:
a non-transitory machine-readable medium comprising instructions executable to:
receive a request, from a user terminal, to predict network performance based at least in part on adding at least one data flow in a connection between the user terminal and at least one of multiple networks over an access point;
receive performance information related to a backhaul of the access point;
predict, in response to the request and based at least in part on the performance information, a set of parameters that govern the network performance between multiple networks based at least in part on one or more ongoing data flows existing for the connection between the user terminal and the at least one of the multiple networks over the access point and in response to the at least one data flow added to the connection between the at least one of the multiple networks and the user terminal over the access point; and
share the set of parameters with a network node in response to addition of the at least one data flow to the connection, wherein the set of parameters comprises information for the network node to determine a performance of communications associated with the network node over each network of the multiple networks.

44. The computer-program product of claim 43, wherein the network node comprises a user terminal.

45. The computer-program product of claim 43, wherein the set of parameters comprises one of:
a noise figure at a Node B;
a target Rise over Thermal at the Node B;
average use of OVSF codes on a high speed downlink packet access channel;
an indicator of whether 64 QAM modulation is supported at the Node B;
an indicator of whether MIMO is supported at the Node B;
an indicator of whether Multi-Carrier is supported at the Node B;
a maximum transport block size supported by the Node B for uplink and downlink;
an average time/frequency resource utilization for an extended Node B; or
a maximum number of bits configured to transmit/receive in a time transmit interval for the extended Node B.

46. An apparatus for wireless communications, comprising:
an antenna; and
a processor coupled to the antenna, the processor being configured to:
receive a request, from a user terminal, to predict network performance information (NPI) based at least in part on adding at least one data flow in a connection between the user terminal and at least one of multiple networks over an access point;
receive performance information related to a backhaul of the access point;
predict, in response to the request and based at least in part on the performance information, the NPI of the at least one of the multiple networks based at least in part on one or more ongoing data flows existing for the connection between the user terminal and the at least one of the multiple networks over the access point and in response to the at least one data flow added to the connection between the at least one of the multiple networks and the user terminal over the access point; and
share the NPI with one or more network nodes in response to addition of the at least one data flow to the connection, wherein the NPI comprises information for the user terminal to determine a performance of communications associated with the user terminal and the at least one of multiple networks over the one or more ongoing data flows and the at least one data flow.

47. The apparatus of claim 46, wherein the NPI comprises at least one of latency information, bitrate information, current load information, total capacity information, leftover capacity information, or packet loss rate information for a communications resource on at least one of the multiple networks.

48. The apparatus of claim 47, wherein the communications resource comprises at least one of a backhaul or radio access network.

49. The apparatus of claim 46, wherein the processor is further configured to predict network performance via a user terminal.

50. The apparatus of claim 46, wherein the processor is further configured to predict network performance via an access node.

51. The apparatus of claim 46, wherein the processor is further configured to broadcast the NPI to the access point.

52. The apparatus of claim 51, wherein the access point covers the user terminal.

53. The apparatus of claim 51, wherein the broadcasting occurs in pre-determined time intervals.

54. The apparatus of claim 46, wherein the machine-readable medium further comprises instructions executable to forward the NPI to the user terminal.

55. The apparatus of claim 46, wherein the processor is further configured to share the NPI between at least two user terminals.

56. The apparatus of claim 46, wherein the processor is further configured to:
  receive a request from the user terminal for the NPI; and
  transmit the NPI in response from the request.

57. The apparatus of claim 46, wherein processor is further configured to:
  create an information element based on the NPI;
  insert the information element into a frame; and
  transmit the frame.

58. An apparatus for wireless communications, comprising:
  an antenna; and
  a processor coupled to the antenna, the processor being configured to:
    receive a request, from a user terminal, to predict network performance based at least in part on adding at least one data flow in a connection between the user terminal and at least one of multiple networks over an access point;
    receive performance information related to a backhaul of the access point;
    predict, in response to the request and based at least in part on the performance information, a set of parameters that govern the network performance between multiple networks based at least in part on one or more ongoing data flows existing for the connection between the user terminal and the at least one of the multiple networks over the access point and in response to the at least one data flow added to the connection between the at least one of the multiple networks and the user terminal over the access point; and
    share the set of parameters with a network node in response to addition of the at least one data flow to the connection, wherein the set of parameters comprises information for the network node to determine a performance of communications associated with the network node over each network of the multiple networks.

59. The apparatus of claim 58, wherein the network node comprises a user terminal.

60. The apparatus of claim 58, wherein the set of parameters comprises one of:
  a noise figure at a Node B;
  a target Rise over Thermal at the Node B;
  average use of OVSF codes on a high speed downlink packet access channel;
  an indicator of whether 64 QAM modulation is supported at the Node B;
  an indicator of whether MIMO is supported at the Node B;
  an indicator of whether Multi-Carrier is supported at the Node B;
  a maximum transport block size supported by the Node B for uplink and downlink;
  an average time/frequency resource utilization for an extended Node B; or
  a maximum number of bits configured to transmit/receive in a time transmit interval for the extended Node B.

* * * * *